US009232482B2

(12) United States Patent
Catovic et al.

(10) Patent No.: US 9,232,482 B2
(45) Date of Patent: Jan. 5, 2016

(54) SYSTEMS, METHODS AND APPARATUS FOR MANAGING MULTIPLE RADIO ACCESS BEARER COMMUNICATIONS

(75) Inventors: Amer Catovic, San Diego, CA (US); Mohamed A. El-Saidny, Dubai (AE)

(73) Assignee: QUALOCOMM Incorporated, San Diego, CA (US)

( * ) Notice: Subject to any disclaimer, the term of this patent is extended or adjusted under 35 U.S.C. 154(b) by 71 days.

(21) Appl. No.: 13/539,002

(22) Filed: Jun. 29, 2012

(65) Prior Publication Data
US 2013/0003631 A1    Jan. 3, 2013

Related U.S. Application Data

(60) Provisional application No. 61/504,068, filed on Jul. 1, 2011.

(51) Int. Cl.
| | |
|---|---|
| *G08C 17/00* | (2006.01) |
| *H04W 52/36* | (2009.01) |
| *H04W 52/32* | (2009.01) |
| *H04L 1/00* | (2006.01) |
| *H04W 52/48* | (2009.01) |

(52) U.S. Cl.
CPC .......... *H04W 52/367* (2013.01); *H04W 52/325* (2013.01); *H04L 1/0006* (2013.01); *H04L 1/0036* (2013.01); *H04W 52/48* (2013.01)

(58) Field of Classification Search
CPC . H04W 52/367; H04W 52/535; H04W 52/48; H04L 1/0006; H04L 1/0036
USPC .......... 370/311, 343, 328, 329, 331; 455/425, 455/436
See application file for complete search history.

(56) References Cited

U.S. PATENT DOCUMENTS

| | | | |
|---|---|---|---|
| 6,970,437 B2 | 11/2005 | Lott et al. | |
| 7,035,240 B1 * | 4/2006 | Balakrishnan et al. | ....... 370/338 |
| 7,289,473 B1 | 10/2007 | Padovani et al. | |
| 7,379,478 B1 | 5/2008 | Mantha | |

(Continued)

FOREIGN PATENT DOCUMENTS

| | | |
|---|---|---|
| EP | 1263160 A1 | 12/2002 |
| EP | 1372310 A1 | 12/2003 |

(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.

(Continued)

*Primary Examiner* — Chuong T Ho
(74) *Attorney, Agent, or Firm* — Ke Liu (57) ABSTRACT

Systems, devices, and methods for managing multiple radio access bearer communications are provided. In one aspect, a device configured to communicate a voice and data communication via a wireless communication link is provided. The device includes a receiver configured to receive information selection criteria associated with a power limited condition. The device further includes a processor configured to detect the power limited condition. The processor is further configured to select information for transmission on a data channel, independent of the received information selection criteria.

44 Claims, 4 Drawing Sheets

(56) References Cited

U.S. PATENT DOCUMENTS

| | | | |
|---|---|---|---|
| 7,751,320 B2 | 7/2010 | Nuzman et al. | |
| 7,962,148 B2 | 6/2011 | Stamoulis et al. | |
| 8,041,375 B2 | 10/2011 | Laroia et al. | |
| 8,620,337 B2* | 12/2013 | Meredith et al. | 455/450 |
| 8,634,384 B2* | 1/2014 | Marsh | 370/332 |
| 8,755,745 B2 | 6/2014 | Gandolfo | |
| 2003/0021262 A1 | 1/2003 | Ma et al. | |
| 2005/0180449 A1 | 8/2005 | Ranta-Aho et al. | |
| 2006/0154603 A1 | 7/2006 | Sachs et al. | |
| 2006/0195727 A1 | 8/2006 | Yoshitsugu et al. | |
| 2006/0291395 A1 | 12/2006 | Ketonen et al. | |
| 2008/0008136 A1 | 1/2008 | Padovani et al. | |
| 2008/0043619 A1 | 2/2008 | Sammour et al. | |
| 2008/0130584 A1 | 6/2008 | Pani et al. | |
| 2008/0132268 A1 | 6/2008 | Choi-Grogan et al. | |
| 2008/0144598 A1 | 6/2008 | Jiang | |
| 2008/0186944 A1 | 8/2008 | Suzuki et al. | |
| 2008/0194282 A1 | 8/2008 | Nibe et al. | |
| 2008/0226074 A1 | 9/2008 | Sammour et al. | |
| 2008/0310338 A1 | 12/2008 | Charpenter et al. | |
| 2009/0044067 A1 | 2/2009 | Obuchi et al. | |
| 2009/0093255 A1 | 4/2009 | Balasubramanian | |
| 2009/0104901 A1 | 4/2009 | Baker et al. | |
| 2009/0135773 A1 | 5/2009 | Aghili et al. | |
| 2009/0157852 A1 | 6/2009 | Krupkin et al. | |
| 2009/0161545 A1 | 6/2009 | Ho et al. | |
| 2009/0175175 A1 | 7/2009 | Somasundaram et al. | |
| 2010/0008302 A1 | 1/2010 | Sayers et al. | |
| 2010/0034114 A1 | 2/2010 | Kim et al. | |
| 2010/0034158 A1* | 2/2010 | Meylan | H04L 1/1854 370/329 |
| 2010/0091723 A1 | 4/2010 | Park et al. | |
| 2010/0113006 A1 | 5/2010 | Pajjuri et al. | |
| 2010/0144363 A1 | 6/2010 | De et al. | |
| 2010/0157895 A1* | 6/2010 | Pani | H04W 52/346 370/328 |
| 2010/0165901 A1 | 7/2010 | Kim | |
| 2010/0195519 A1 | 8/2010 | Ji | |
| 2010/0220615 A1 | 9/2010 | Enstrom et al. | |
| 2010/0260049 A1 | 10/2010 | Racz et al. | |
| 2010/0278341 A1 | 11/2010 | Kubota | |
| 2010/0316040 A1* | 12/2010 | Kim et al. | 370/343 |
| 2010/0323748 A1 | 12/2010 | Padovani et al. | |
| 2011/0009073 A1 | 1/2011 | Burbidge et al. | |
| 2011/0019756 A1 | 1/2011 | Chun et al. | |
| 2011/0105174 A1 | 5/2011 | Pelletier et al. | |
| 2011/0149787 A1 | 6/2011 | Digirolamo et al. | |
| 2011/0158140 A1 | 6/2011 | Asokan | |
| 2011/0158194 A1* | 6/2011 | Musikka et al. | 370/329 |
| 2011/0179329 A1 | 7/2011 | Kim et al. | |
| 2011/0194479 A1 | 8/2011 | Jin et al. | |
| 2011/0243080 A1* | 10/2011 | Chen et al. | 370/329 |
| 2011/0249563 A1 | 10/2011 | Provvedi et al. | |
| 2011/0268088 A1 | 11/2011 | Lindskog et al. | |
| 2011/0269463 A1 | 11/2011 | Wang et al. | |
| 2011/0286387 A1 | 11/2011 | Sane et al. | |
| 2011/0317719 A1 | 12/2011 | Vedantham et al. | |
| 2012/0002541 A1 | 1/2012 | Lee et al. | |
| 2012/0009930 A1 | 1/2012 | Brisebois et al. | |
| 2012/0020286 A1 | 1/2012 | Damnjanovic et al. | |
| 2012/0026921 A1 | 2/2012 | Choi | |
| 2012/0064908 A1 | 3/2012 | Fox et al. | |
| 2012/0069750 A1 | 3/2012 | Xing et al. | |
| 2012/0082096 A1 | 4/2012 | Cave et al. | |
| 2012/0083264 A1* | 4/2012 | Ramasamy et al. | 455/425 |
| 2012/0093110 A1 | 4/2012 | Somasundaram et al. | |
| 2012/0178438 A1 | 7/2012 | Vashi et al. | |
| 2012/0201134 A1 | 8/2012 | Wang et al. | |
| 2012/0269148 A1 | 10/2012 | Hultell et al. | |
| 2013/0003523 A1 | 1/2013 | Singh et al. | |
| 2013/0003542 A1 | 1/2013 | Catovic et al. | |
| 2013/0021915 A1 | 1/2013 | Catovic et al. | |
| 2013/0033990 A1 | 2/2013 | Catovic et al. | |
| 2013/0064098 A1 | 3/2013 | El-Saidny et al. | |
| 2013/0077616 A1 | 3/2013 | Arulprakasam et al. | |
| 2013/0094483 A1* | 4/2013 | Marinier | H04W 52/346 370/336 |
| 2013/0148499 A1 | 6/2013 | Racz et al. | |
| 2014/0133323 A9 | 5/2014 | Guarino | |
| 2015/0009950 A1 | 1/2015 | Sundberg et al. | |

FOREIGN PATENT DOCUMENTS

| | | |
|---|---|---|
| EP | 1465371 A1 | 10/2004 |
| EP | 1653758 A1 | 5/2006 |
| EP | 1768296 A2 | 3/2007 |
| EP | 1811690 A1 | 7/2007 |
| EP | 1956728 A2 | 8/2008 |
| EP | 2256996 A1 | 12/2010 |
| EP | 2317815 A1 | 5/2011 |
| JP | 2006087113 A | 3/2006 |
| JP | 2008048325 A | 2/2008 |
| JP | 2008199157 A | 8/2008 |
| JP | 2009044370 A | 2/2009 |
| JP | 2009517935 A | 4/2009 |
| JP | 2009188739 A | 8/2009 |
| JP | 2011518468 A | 6/2011 |
| JP | 2012521150 A | 9/2012 |
| JP | 2013506364 A | 2/2013 |
| WO | 0038368 A1 | 6/2000 |
| WO | 0122645 A1 | 3/2001 |
| WO | 0193513 A2 | 12/2001 |
| WO | 2005011212 A1 | 2/2005 |
| WO | 2005015940 A1 | 2/2005 |
| WO | 2005112500 A1 | 11/2005 |
| WO | 2006012377 A1 | 2/2006 |
| WO | 2008097544 A2 | 8/2008 |
| WO | 2009046374 | 4/2009 |
| WO | 2009058085 A2 | 5/2009 |
| WO | 2009116939 A2 | 9/2009 |
| WO | 2010088295 A1 | 8/2010 |
| WO | 2010107360 A1 | 9/2010 |
| WO | 2011025438 A1 | 3/2011 |
| WO | 2011072735 A1 | 6/2011 |

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).

Brunner, et al., "Inter-System Handover Parameter Optimization," 2006 IEEE 64th Vehicular Technology Conference, pp. 1-6.

International Search Report and Written Opinion—PCT/US2012/045324—ISA/EPO—Oct. 5, 2012.

Siemens: "Contribution to Power Limit Problem in HSDPA Case", 3GPP Draft; R2-040981, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; 20040517, May 17, 2004, XP050125851.

Xu, et al., "Performance Analysis On The Radio Link Control Protocol Of UMTS System," Proceedings from 2002 IEEE 56th Vehicular Technology Conference, vol. 4, pp. 2026-2030.

Samsung, "CQI and ACK/NACK Transmission Supporting Dual-Cell HSDPQ", 3GPP TSG-RAN WG1#54b, R1-083562, Oct. 3, 2008.

Renesas Mobile Europe Ltd: "Cell update-less RLC/PDCP unrecoverable error recovery", 3GPP R2-113178, 3GPP, May 9, 2011, 2 Pages.

* cited by examiner

SYSTEMS, METHODS AND APPARATUS FOR MANAGING MULTIPLE RADIO ACCESS BEARER COMMUNICATIONS

CROSS-REFERENCE TO RELATED APPLICATIONS

The disclosure claims priority to U.S. Provisional Patent Application No. 61/504,068 filed Jul. 1, 2011, entitled "METHODS AND APPARATUS FOR PREVENTING MULTI-RAB CALL DROPS CAUSED BY FAILING PS RAB" and assigned to the assignee hereof. The disclosure of this prior application is considered part of, and is incorporated by reference in, this disclosure.

BACKGROUND

Aspects of the present invention relate to wireless communication, and in particular, to systems, method and apparatus configured to enable multiple radio access bearer communications based on wireless conditions.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide connectivity between a wireless terminal or terminals and the core communications network. In a UMTS radio access network (RAN), the functionalities of a base station may be split across two network elements: the Radio Network Controller (RNC) handles, among other functions, connection setup, resource assignment and mobility; the base node (NodeB) configured to handle the radio transmission and reception to and from wireless terminals as well as the resource allocation for connected users on the shared channels.

To establish a call connection between a wireless terminal and a base station, a Radio Access Bearer (RAB) is needed. The RAB carries voice or other data between the wireless terminal and the core communication network. There are different types of RABs for different types of data, such as, for example, voice data, streaming data (e.g. streaming a video clip), interactive data (e.g. interacting with a website) and others. Simultaneous voice and data connections require multiple RABs and may be referred to as Multi-RAB or MRAB connections. In the early days of combined voice and data networks, e.g. 3G UMTS, simultaneous voice and data connections were not prevalent. However, newer wireless terminal devices (e.g. touch-screen cellular telephones) increasingly use voice and data connections simultaneously. Accordingly, there is a need for improved management of MRAB resources. Particularly, MRAB calls can experience a significantly higher dropped call rate (DCR) compared to voice calls in UMTS 3G networks world-wide. Dedicated optimizations on the network and user equipment side can mitigate the poor performance of MRAB calls.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage data transmission in MRAB calls.

In one aspect, a method of improving wireless connection in a voice and data communication is provided. The method includes receiving, at a mobile station, information selection criteria associated with a power limited condition. The method further includes detecting the power limited condition. The method further includes selecting information for transmission on a data channel. The information is selected independent of the received information selection criteria.

In one embodiment, selecting information for transmission can include omitting Acknowledgements (ACKS) and Negative-Acknowledgements (NACKS) during the power limited condition. In another embodiment, selecting information for transmission can include selecting only Radio Link Control (RLC) Acknowledgements (ACKS) and Negative-Acknowledgements (NACKS) during the power limited condition. In another embodiment, selecting information for transmission can include selecting only Transmission Control Protocol (TCP) and Radio Link Control (RLC) Acknowledgements (ACKS) and Negative-Acknowledgements (NACKS) during the power limited condition. The method can further include deferring one or more unselected information for transmission after the power limited condition is no longer detected. The method can further include detecting the first radio-frequency condition at a wireless device, when the wireless device is running out of transmit power. The uplink data can be part of a multi radio access bearer (MRAB) call.

In another aspect, a device configured to communicate a voice and data communication via a wireless communication link is provided. The device includes a receiver configured to receive information selection criteria associated with a power limited condition. The device further includes a processor configured to detect the power limited condition. The processor is further configured to select information for transmission on a data channel. The information is selected independent of the received information selection criteria.

In one embodiment, the processor can be configured to omit Acknowledgements (ACKS) and Negative-Acknowledgements (NACKS) during the power limited condition. In one embodiment, the processor can be configured to select only Radio Link Control (RLC) Acknowledgements (ACKS) and Negative-Acknowledgements (NACKS) during the power limited condition. In one embodiment, the processor can be configured to select only Transmission Control Protocol (TCP) and Radio Link Control (RLC) Acknowledgements (ACKS) and Negative-Acknowledgements (NACKS) during the power limited condition. In one embodiment, the processor can be configured to defer one or more unselected information for transmission after the power limited condition is no longer detected. In one embodiment, the processor can be configured to detect the first radio-frequency condition at the device, when the device is running out of transmit power. The uplink data can be part of a multi radio access bearer (MRAB) call.

In another aspect, another device configured to communicate a voice and data communication via a wireless communication link is provided. The device includes means for receiving information selection criteria associated with a power limited condition. The device further includes means for detecting the power limited condition. The device further includes means for selecting information for transmission on a data channel. Information is selected independent of the received information selection criteria.

In one embodiment, means for selecting information for transmission can include means for omitting Acknowledgements (ACKS) and Negative-Acknowledgements (NACKS) during the power limited condition. In one embodiment, means for selecting information for transmission can include means for selecting only Radio Link Control (RLC) Acknowledgements (ACKS) and Negative-Acknowledgements (NACKS) during the power limited condition. In one embodiment, means for selecting information for transmission can include means for selecting only Transmission Control Protocol (TCP) and Radio Link Control (RLC) Acknowledgements (ACKS) and Negative-Acknowledgements (NACKS) during the power limited condition. The device can further include means for deferring one or more unselected information for transmission after the power limited condition is no longer detected. Means for detecting can include means for detecting the first radio-frequency condition at the device, when the device is running out of transmit power. The uplink data can be part of a multi radio access bearer (MRAB) call.

In another aspect, a non-transitory computer readable storage medium is provided. The medium includes instructions that, when executed by a processor of an apparatus, cause the apparatus to receive information selection criteria associated with a power limited condition. The medium further includes instructions that, when executed by a processor of the apparatus, cause the apparatus to detect the power limited condition. The medium further includes instructions that, when executed by a processor of the apparatus, cause the apparatus to select information for transmission on a data channel. The information is selected independent of the received information selection criteria.

In one embodiment, the medium can further include instructions that, when executed by a processor of the apparatus, cause the apparatus to omit Acknowledgements (ACKS) and Negative-Acknowledgements (NACKS) during the power limited condition. In one embodiment, the medium can further include instructions that, when executed by a processor of the apparatus, cause the apparatus to select only Radio Link Control (RLC) Acknowledgements (ACKS) and Negative-Acknowledgements (NACKS) during the power limited condition. In one embodiment, the medium can further include instructions that, when executed by a processor of the apparatus, cause the apparatus to select only Transmission Control Protocol (TCP) and Radio Link Control (RLC) Acknowledgements (ACKS) and Negative-Acknowledgements (NACKS) during the power limited condition. In one embodiment, the medium can further include instructions that, when executed by a processor of the apparatus, cause the apparatus to defer one or more unselected information for transmission after the power limited condition is no longer detected. In one embodiment, the medium can further include instructions that, when executed by a processor of the apparatus, cause the apparatus to detect the first radio-frequency condition at a wireless device, when the wireless device is running out of transmit power. The uplink data can be part of a multi radio access bearer (MRAB) call.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3 GPP2).

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (wireless terminal 100) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

Figure 1:
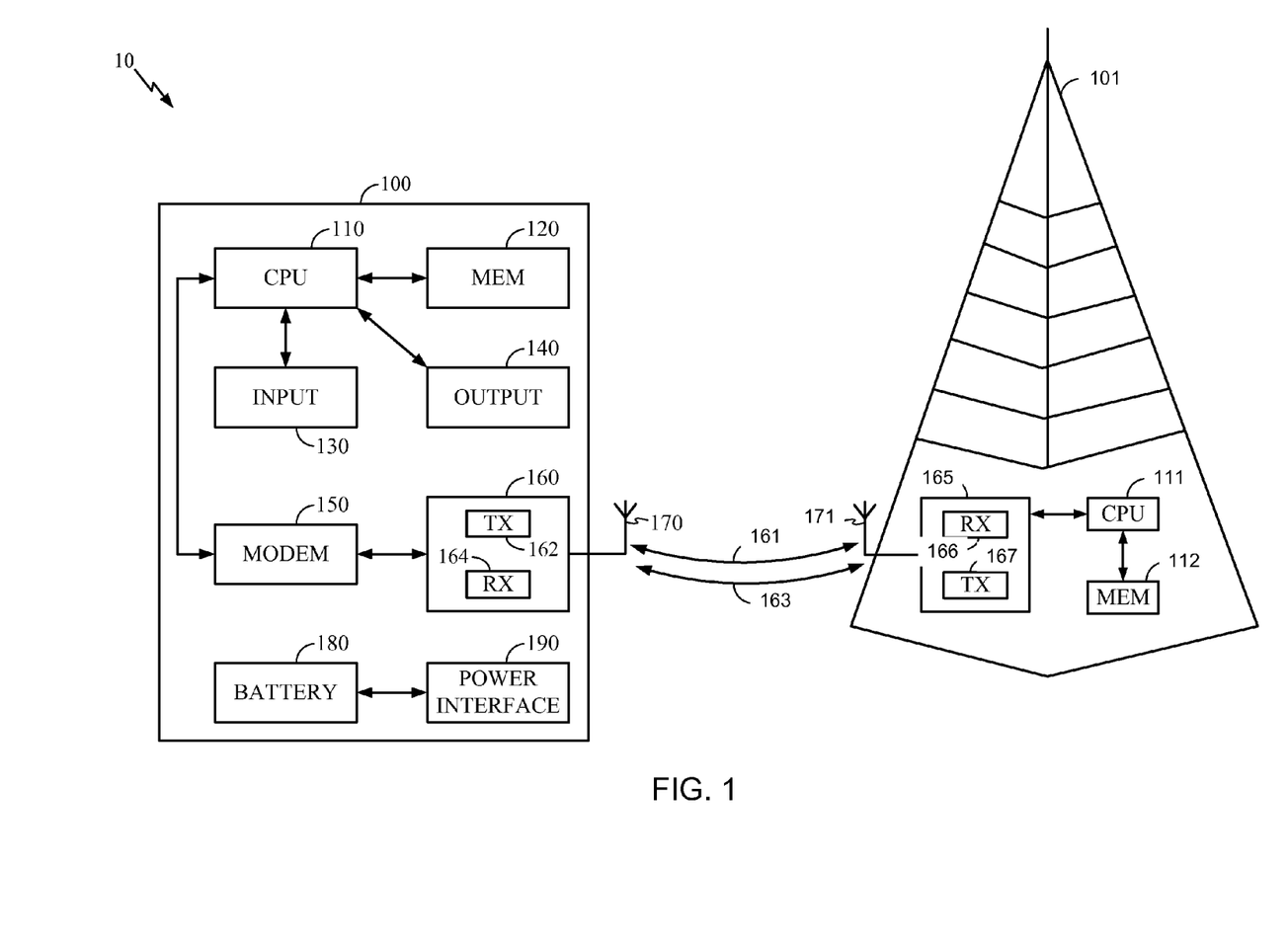
FIG. 1 shows an exemplary functional block diagram of a wireless communication system.

FIG. 1 shows an exemplary functional block diagram of a wireless communication system. The wireless communication system 10 may include at least one wireless terminal 100 and at least one base station 101 configured to communicate with each other over a first communication link 161 and a second communication link 163. Each of the first and second communication links 161, 163 can be a single-packet communication link on which a single packet may be transmitted during each cycle or a multi-packet communication link on which on which multiple packets may be transmitted during each cycle. For example, the first communication link 161 can be a dual-packet communication link on which zero, one, or two packets can be transmitted during each cycle.

In the implementation shown in FIG. 1, the wireless terminal 100 includes a processor 110 coupled with a memory 120, an input device 130, and an output device 140. The processor may be coupled with a modem 150 and a transceiver 160. The transceiver 160 shown is also coupled with the modem 150 and an antenna 170. The wireless terminal 100 and components thereof may be powered by a battery 180 and/or an external power source. In some implementations, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be implemented in a single chip. Similarly, two or more of the processor 110, modem 150, and transceiver 160 may be implemented in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

In the implementation shown in FIG. 1, the processor 110 can be coupled, via one or more buses, with read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled with an input device 130 and an output device 140 configured for, respectively, receiving input from and providing output to, a user of the wireless terminal 100. Suitable input devices may include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled with audio processing software to, e.g., detect voice commands). Suitable output devices may include, but are not limited to, visual output devices, including displays and printers, audio output devices, including speakers, headphones, earphones, and alarms, and haptic output devices, including force-feedback game controllers and vibrating devices.

The processor 110 may be coupled with a modem 150 and a transceiver 160. The modem 150 and transceiver 160 may be configured to prepare data generated by the processor 110 for wireless transmission over the communication links 161, 163 via the antenna 170. The modem 150 and transceiver 160 also demodulate data received over the communication links 161, 163 via the antenna 170. In some implementations, the modem 150 and the transceiver 160 may be configured to operate according to one or more air interface standards. The transceiver can include a transmitter 162, a receiver 164, or both. In other implementations, the transmitter 162 and receiver 164 are two separate components. The modem 150 and transceiver 160, can be implemented as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof may be powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some implementations, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some implementations, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

As shown in FIG. 1, the base station 101 also includes at least a processor 111 coupled with a memory 112 and a transceiver 165. The transceiver 165 includes a transmitter 167 and a receiver 166 coupled with an antenna 171. The processor 111, memory 112, transceiver 165, and antenna 171 can be implemented as described above with respect to the wireless terminal 100.

In the wireless communication system 10 of FIG. 1, the base station 101 can transmit data packets to the wireless terminal 100 via a first communication link 161 and/or a second communication link 163.

Figure 2:
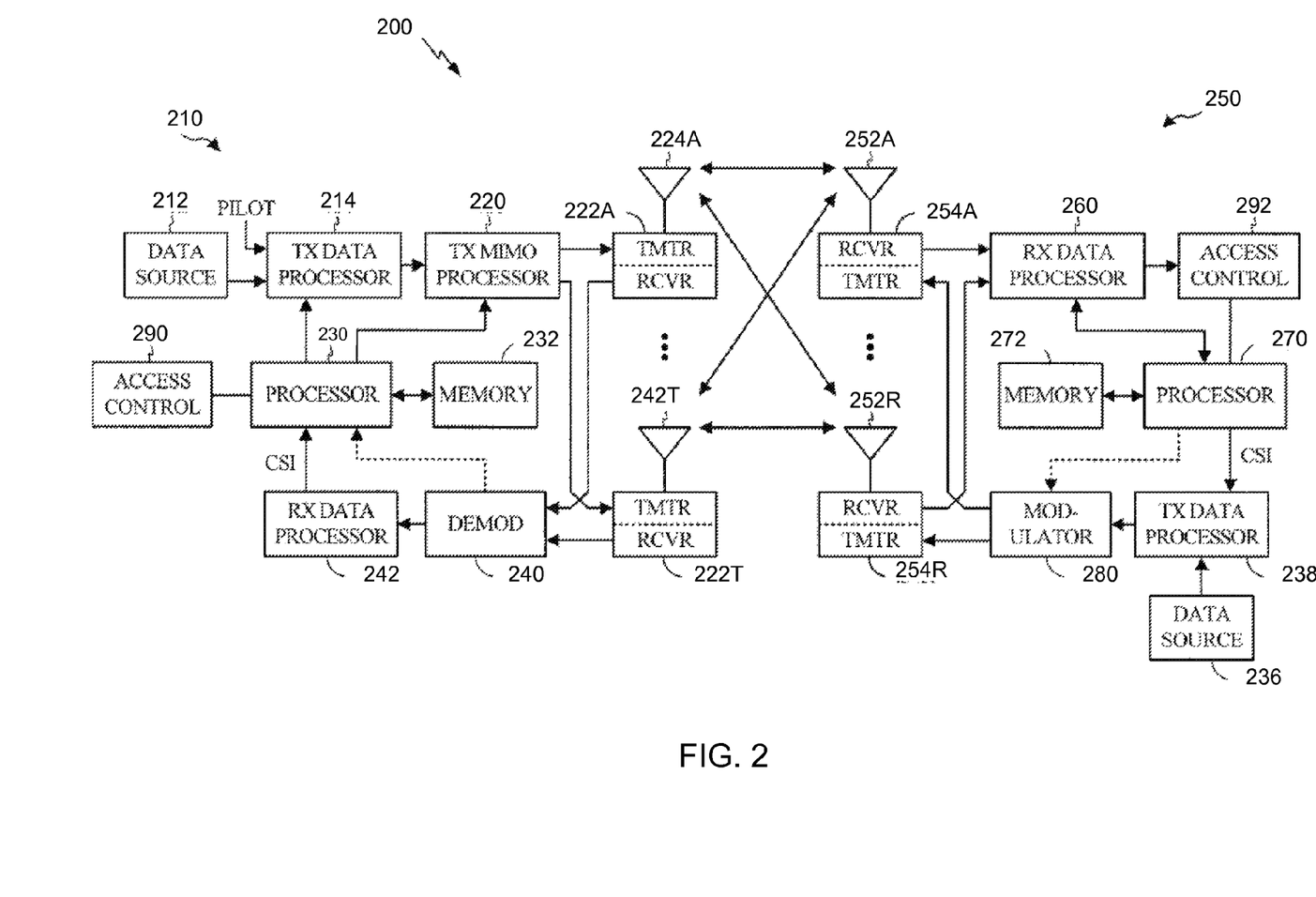
FIG. 2 shows an exemplary functional block diagram of components that may be employed to facilitate communication between communication nodes, such a wireless terminal and a base station.

FIG. 2 shows an exemplary functional block diagram of components that may be employed to facilitate communication between communication nodes, such a wireless terminal and a base station. Specifically, FIG. 2 is a simplified block diagram of a first wireless device 210 (e.g., a base station) and a second wireless device 250 (e.g., a wireless terminal) of a communication system 200. At the first device 210, traffic data for a number of data streams is provided from a data source 212 to a transmit (TX) data processor 214.

In some implementations, each data stream is transmitted over a respective transmit antenna. The TX data processor 214 may be configured to format, code, and interleave the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 210.

In the implementation shown in FIG. 2, the modulation symbols for some data streams may be provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the channel. Modulated signals from transceivers 222A through 222T are then transmitted from antennas 224A through 224T, respectively.

At the second device 250, the transmitted modulated signals are received by antennas 252A through 252R and the received signal from each antenna 252 is provided to a respective transceiver (XCVR) 254A through 254R. Each transceiver 254 may be configured to condition (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 210.

The processor 270 formulates an uplink message, which may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the second device 250 are received by the antennas 224, conditioned by the transceivers 222, demodulated by a demodulator (DEMOD) 240, and processed by an RX data processor 242 to extract the uplink message transmitted by the second device 250. The processor 230 then processes the extracted message.

FIG. 2 also illustrates that the communication components may include one or more components that perform access control. For example, an access control component 290 may cooperate with the processor 230 and/or other components of the device 210 to send/receive signals to/from another device (e.g., device 250). Similarly, an access control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the access control component 290 and the processor 230 and a single processing component may provide the functionality of the access control component 292 and the processor 270.

The interface between base stations and wireless terminals may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal. This layer may additionally provide control of aspects of the wireless terminal from the base station and may include functions to control radio bearers, physical channels, mapping of different channel types, measurement and other functions.

A major cause contributing to higher DCR for MRAB calls can be the failure of the data connection, such as a Packet Switched (PS) RAB, in poor radio frequency (RF) environments. Even in poor RF conditions when the wireless terminal 100 (FIG. 1) transmit power reaches a maximum level, the wireless terminal 100 can continue sending small amounts of data in the uplink (UL). In an embodiment, a minimum set of Transport Format Combinations (TFCs) is a set of TFCs that the wireless terminal 100 is allowed to transmit in the UL regardless of an assigned transmit power budget and/or headroom restriction.

In some implementations, a TFC including only one Transmit Block from the PS RAB is in the Minimum Set of TFCs. Accordingly, data can be transmitted in the UL even when the wireless terminal 100 is running out of power (i.e., in a power limited condition), provided that there is no voice or signaling to be transmitted. However, the transmitted UL data may not be acknowledged by the access point (AP) due to the poor RF conditions. After relevant timers expire, the wireless terminal 100 can trigger a Radio Link Control (RLC) reset procedure. The reset procedure can also fail due to the poor RF conditions. Unsuccessful reset can lead to a drop of the Radio Resource Control (RRC) connection, resulting in a dropped call compliant with the applicable standard. In various embodiments, a network policy may allow data-only calls to drop, because they can be easily re-established. On the other hand, it may not be acceptable for MRAB calls to drop under circumstances where a reset on the data call will bring down the voice call as well.

Accordingly, there is a need to isolate the PS RABs from the other RABs to prevent the PS RABs from bringing down an entire connection in poor RF conditions. In an embodiment, the wireless terminal 100 can avoid sending UL data in MRAB calls in poor RF conditions, in situations where the wireless terminal 100 is running out of transmit power. More specifically, the wireless terminal 100 can avoid sending the UL data in a standard-compliant manner. The methods and systems described herein are particularly applicable to Voice+Release 99 (R99) UL+HSDPA downlink (DL) MRAB configurations. In an embodiment, the systems and methods described herein can be implemented in a wireless terminal 100 without modification to Global Certification Forum (GCF) standards.

In one embodiment, the wireless terminal 100 can restrict UL transmission of non-essential information in MRAB calls under poor RF conditions. Essential information can include RLC control Protocol Data Units (PDUs) carrying RLC ACKs/NACKs for the DL, and/or RLC data PDUs carrying TCP ACKs/NACKs for the DL. The wireless terminal 100 can disallow UL data transmission of non-essential information in poor RF conditions by keeping all TFCs containing at least one Transport Block (TB) associated with the PS RAB outside of the minimum set of TFCs. If one of the exclusion conditions listed above is fulfilled, at least one TFC containing a TB associated with the PS RAB can be allowed into the minimum set of TFCs. In poor RF conditions, when the wireless terminal 100 is reaching max transmit power, only TFCs from the minimum set of TFCs may be valid.

Figure 3:
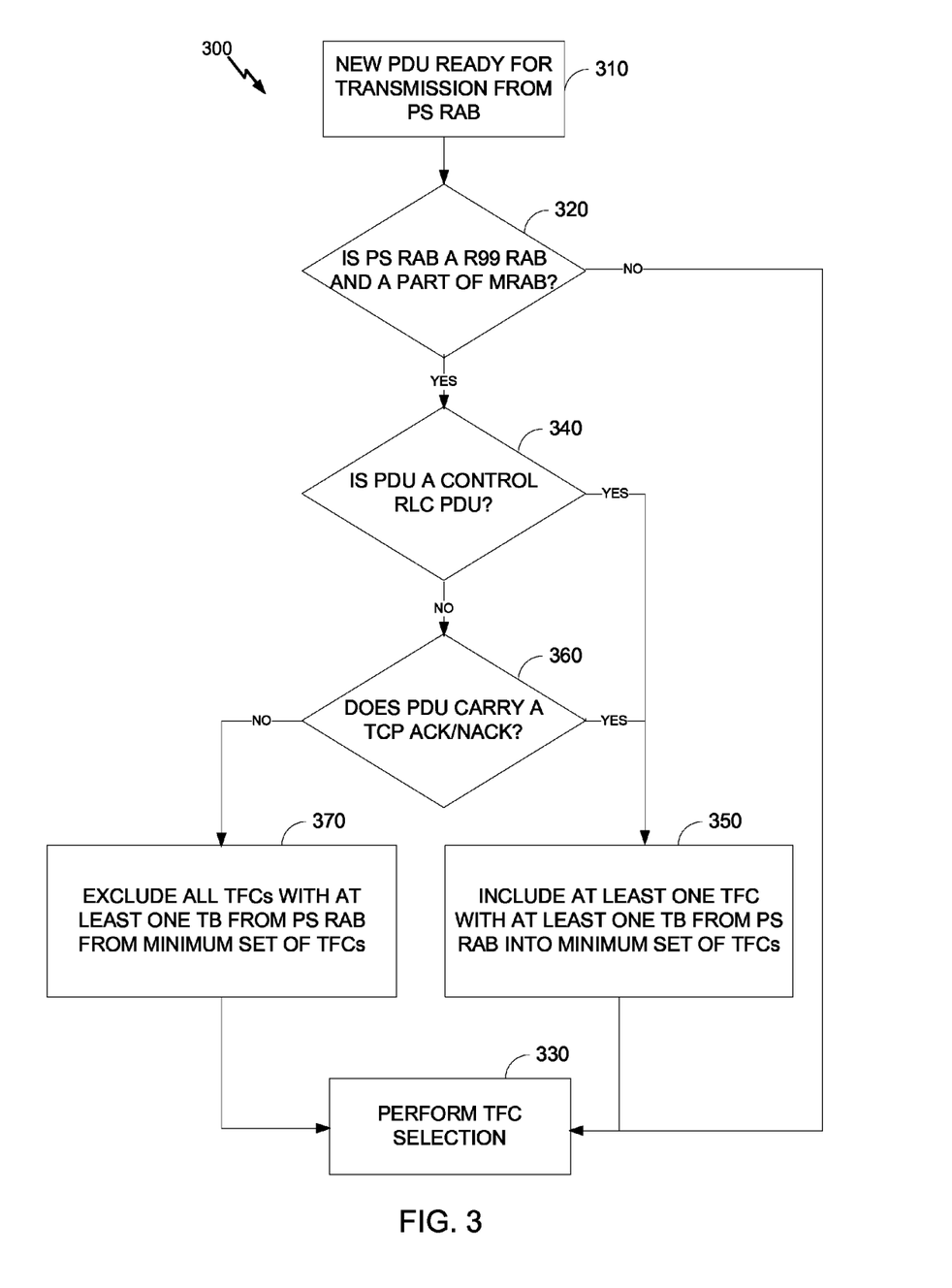
FIG. 3 shows an exemplary flowchart illustrating an implementation of a method of wireless communication in the wireless terminal of FIG. 1.

FIG. 3 shows an exemplary flowchart illustrating an implementation of a method 300 of wireless communication in the wireless terminal 100 of FIG. 1. Although the method 300 is described herein with reference to the wireless terminal 100 discussed above with respect to FIG. 1, a person having ordinary skill in the art will appreciate that the method 300 may be implemented by any other suitable device such as, for example, one or both of the devices 210 and 250 (FIG. 2). In an embodiment, method 300 may be performed by the CPU 110 in conjunction with the transmitter 162, the receiver 164, and the memory 120. Although the method 300 is described herein with reference to a particular order, in various embodiments, blocks herein may be performed in a different order, or omitted, and additional blocks may be added.

First, the method 300 begins at block 310, when a new PDU is ready for transmission from a PS RAB. At block 320, the wireless terminal 100 determines whether the PS RAB is both a R99 RAB and a part of an MRAB. If the PS RAB is not both a R99 RAB and a part of an MRAB, the wireless terminal 100 proceeds to perform TFC selection at block 330. If, on the other hand, the PS RAB is both a R99 RAB and a part of an MRAB, then the wireless terminal 100 proceeds to block 340.

Next, at block 340, the wireless terminal 100 determines whether the PDU is a control RLC PDU. If the PDU is a control RLC PDU, the wireless terminal 100 proceeds to block 350, where the wireless terminal 100 includes at least one TFC, with at least one TB from the PS RAB, in the minimum set of TFCs. The wireless terminal 100 then proceeds to block 330 and performs TFC selection. If, on the other hand, the PDU is not a control RLC PDU, then the wireless terminal 100 proceeds to block 360.

Then, at block 360, the wireless terminal 100 determines whether the PDU carries a TCP ACK or NACK. If the PDU does carry a TCP ACK or NACK, the wireless terminal 100 proceeds to block 350, where the wireless terminal 100 includes at least one TFC, with at least one TB from the PS RAB, in the minimum set of TFCs. The wireless terminal 100 then proceeds to block 330 and performs TFC selection. If, on the other hand, the PDU does not carry a TCP ACK or NACK, then the wireless terminal 100 proceeds to block 370.

Subsequently, at block 370, when the PDU does not carry a TCP ACK or NACK, the wireless terminal 100 excludes all TFCs, with at least one TB from the PS RAB, from the minimum set of TFCs. The wireless terminal 100 then proceeds to block 330 and performs TFC selection.

In accordance with the above, the wireless terminal 100 can determine whether the PDU carries TCP ACK/NACK or not using one or more of: deep packet inspection at the RLC or MAC layer, and an explicit indication from higher protocol layers. In an embodiment, the wireless terminal 100 can skip the determination of whether the PDU carries a TCP ACK or NACK under certain circumstances. For example, the wireless terminal 100 can implement an exclusion period during which TFCs carrying TBs from PS RABs are included in the minimum set of TFCs. In another embodiment, the exclusion period can by periodic or aperiodic. In another embodiment, the exclusion can be dynamic, for example based on a buffer occupancy status or the like.

Figure 4:
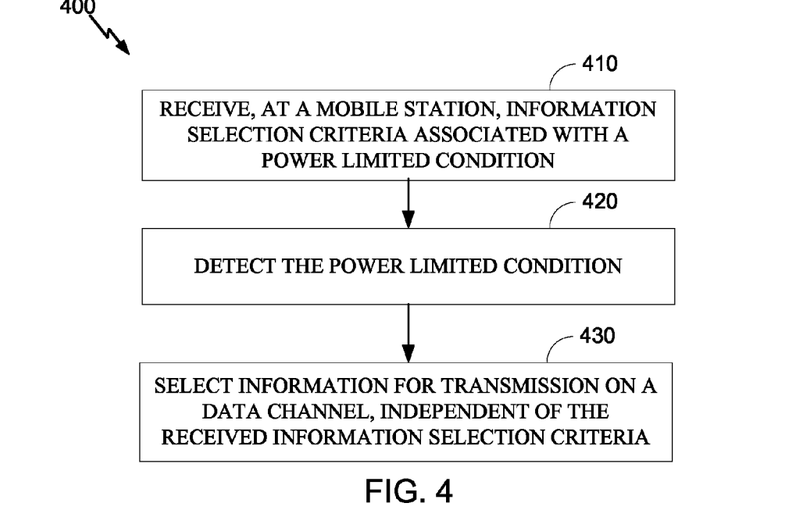
FIG. 4 shows an exemplary flowchart illustrating another implementation of a method of wireless communication in the wireless terminal of FIG. 1.

FIG. 4 is a flowchart illustrating another implementation of a method of transmission power control in a wireless terminal. Although the method 400 is described herein with reference to the wireless terminal 100 discussed above with respect to FIG. 1, a person having ordinary skill in the art will appreciate that the method 400 may be implemented by any other suitable device such as, for example, one or both of the devices 210 and 250 (FIG. 2). In an embodiment, the method 400 may be performed by the CPU 110 in conjunction with the transmitter 162, the receiver 164, and the memory 120. Although the method 400 is described herein with reference to a particular order, in various embodiments, blocks herein may be performed in a different order, or omitted, and additional blocks may be added.

First, the method 400 begins at block 410 where the wireless terminal 100 receives information selection criteria associated with a power limited condition. The wireless terminal 100 can receive the information selection criteria, for example, from the base station 101 via the antenna 170. In various embodiments, the information selection criteria may request and/or command the wireless terminal 100 to allow or deny specific communications according to criteria such as a power limited condition.

A power limited condition may exist when, for example, the wireless terminal 100 is approaching, meeting, or exceeding an available transmission power budget. The wireless terminal 100 may increase its transmission power, for example, in poor RF conditions where the base station 101 does not well receive transmissions from the wireless terminal 100. As an example, the base station 101 may direct the wireless terminal 100, via the information selection criteria, to transmit non-essential information even in poor RF conditions.

Next, at block 420, the wireless terminal 100 detects the power limited condition. In various embodiments, the wireless terminal 100 can detect the power limited condition by measuring transmission power, comparing transmission power to a threshold, measuring total power consumption, battery status, etc. When the wireless terminal 100 detects the power limited condition, the method 400 proceeds to block 430.

Then, at block 430, the wireless terminal 100 selects information for transmission on a data channel, independent of the received information selection criteria. For example, the wireless terminal 100 may omit one or more blocks of information (for example, non-essential information) on the data channel, even when such omission conflicts with instructions received from the base station 101. As another example, the wireless terminal 100 may transmit one or more blocks of information (for example, essential information) on the data channel, even when such transmission conflicts with instructions received from the base station 101.

Accordingly, the wireless terminal 100 may independently, or unilaterally, determine what information to transmit over the data channel. In various circumstances, the wireless terminal 100 may be better able to determine which information should be transmitted over the data channel in order to increase the likelihood of maintaining a simultaneous voice channel.

Figure 5:
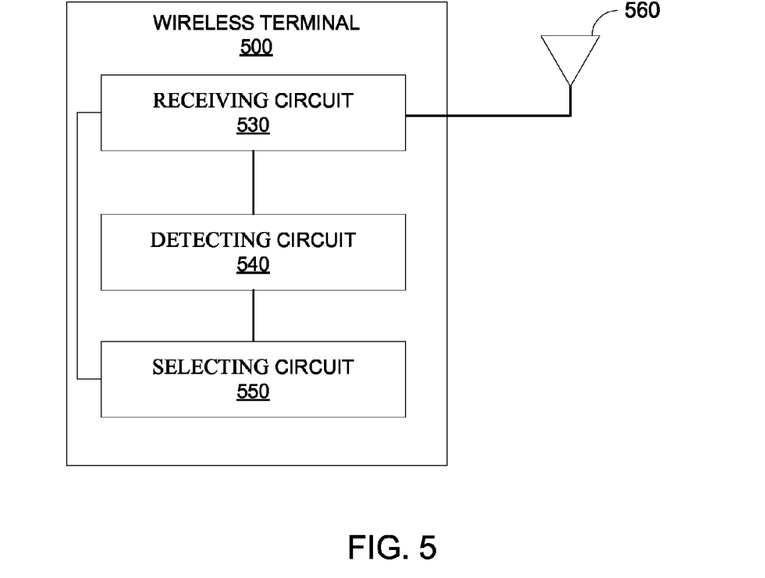
FIG. 5 shows an exemplary functional block diagram of another wireless terminal.

FIG. 5 shows an exemplary functional block diagram of another wireless terminal. Those skilled in the art will appreciate that a wireless terminal may have more components than the simplified wireless terminal 500 illustrated in FIG. 5. The wireless terminal 500 illustrates only those components useful for describing some prominent features of implementations within the scope of the claims.

In the illustrated embodiment, the wireless terminal 500 includes a receiving circuit 530, a detecting circuit 540, a selecting circuit 550, and an antenna 560. In one implementation the receiving circuit 530 is configured to receive information selection criteria associated with a power limited condition. For example, the receiving circuit may be configured to perform block 410 as described with respect to FIG. 4 above. In one implementation, means for receiving includes a receiving circuit 530.

The detecting circuit 540 is configured to detect the power limited condition. For example, the detecting circuit 540 may be configured to perform block 420 as described with respect to FIG. 4 above. In some implementations, means for detecting includes a detecting circuit 540.

The selecting circuit 550 is configured to select information for transmission on the data channel, independent of the received information selection criteria. For example, the selecting circuit 550 may be configured to perform block 430 as described with respect to FIG. 4 above. In one implementation, means for selecting includes the selecting circuit 550.

A wireless terminal may comprise, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may comprise an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may comprise a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of improving wireless connection in a voice and data communication, comprising:
   receiving, at a mobile station, information selection criteria associated with a power limited condition;
   detecting the power limited condition; and selecting information for transmission on a data channel, independent of the received information selection criteria, wherein selecting information for transmission comprises one or a combination of:
- omitting acknowledgements (ACKS) and negative-acknowledgements (NACKS) during the power limited condition;
- selecting Radio Link Control (RLC) acknowledgements (ACKS) and negative-acknowledgements (NACKS) during the power limited condition; or
- selecting Transmission Control Protocol (TCP) and Radio Link Control (RLC) acknowledgements (ACKS) and negative-acknowledgements (NACKS) during the power limited condition.

2. The method of claim 1, wherein selecting information for transmission comprises omitting acknowledgements (ACKS) and negative-acknowledgements (NACKS) during the power limited condition.

3. The method of claim 1, wherein selecting information for transmission comprises selecting only Radio Link Control (RLC) acknowledgements (ACKS) and negative-acknowledgements (NACKS) during the power limited condition.

4. The method of claim 1, wherein selecting information for transmission comprises selecting only Transmission Control Protocol (TCP) and Radio Link Control (RLC) acknowledgements (ACKS) and negative-acknowledgements (NACKS) during the power limited condition.

5. The method of claim 1, further comprising deferring one or more unselected information for transmission after the power limited condition is no longer detected.

6. The method of claim 1, wherein said detecting comprises detecting the first radio-frequency condition at a wireless device, when the wireless device is running out of transmit power.

7. The method of claim 1, wherein said uplink data comprises at least part of a multi radio access bearer (MRAB) call.

8. A device configured to communicate a voice and data communication via a wireless communication link, the device comprising:
- a receiver configured to receive information selection criteria associated with a power limited condition; and
- a processor configured to:
  - detect the power limited condition;
  - select information for transmission on a data channel, independent of the received information selection criteria; and one or a combination of:
    - omit acknowledgements (ACKS) and negative-acknowledgements (NACKS) during the power limited condition;
    - select Radio Link Control (RLC) acknowledgements (ACKS) and negative-acknowledgements (NACKS) during the power limited condition; or
    - select Transmission Control Protocol (TCP) and Radio Link Control (RLC) acknowledgements (ACKS) and negative-acknowledgements (NACKS) during the power limited condition.

9. The device of claim 8, wherein the processor is configured to omit acknowledgements (ACKS) and negative-acknowledgements (NACKS) during the power limited condition.

10. The device of claim 8, wherein the processor is configured to select only Radio Link Control (RLC) acknowledgements (ACKS) and negative-acknowledgements (NACKS) during the power limited condition.

11. The device of claim 8, wherein the processor is configured to select only Transmission Control Protocol (TCP) and Radio Link Control (RLC) acknowledgements (ACKS) and negative-acknowledgements (NACKS) during the power limited condition.

12. The device of claim 8, wherein the processor is configured to defer one or more unselected information for transmission after the power limited condition is no longer detected.

13. The device of claim 8, wherein the processor is configured to detect the first radio-frequency condition at the device, when the device is running out of transmit power.

14. The device of claim 8, wherein said uplink data comprises at least part of a multi radio access bearer (MRAB) call.

15. An apparatus for communicating a voice and data communication via a wireless communication link, the apparatus comprising:
- means for receiving information selection criteria associated with a power limited condition;
- means for detecting the power limited condition; and
- means for selecting information for transmission on a data channel, independent of the received information selection criteria, wherein means for selecting information for transmission comprises one or a combination of:
- means for omitting acknowledgements (ACKS) and negative-acknowledgements (NACKS) during the power limited condition;
- means for selecting Radio Link Control (RLC) acknowledgements (ACKS) and negative-acknowledgements (NACKS) during the power limited condition; or
- means for selecting Transmission Control Protocol (TCP) and Radio Link Control (RLC) acknowledgements (ACKS) and negative-acknowledgements (NACKS) during the power limited condition.

16. The apparatus of claim 15, wherein means for selecting information for transmission comprises means for omitting acknowledgements (ACKS) and negative-acknowledgements (NACKS) during the power limited condition.

17. The apparatus of claim 15, wherein means for selecting information for transmission comprises means for selecting only Radio Link Control (RLC) acknowledgements (ACKS) and negative-acknowledgements (NACKS) during the power limited condition.

18. The apparatus of claim 15, wherein means for selecting information for transmission comprises means for selecting only Transmission Control Protocol (TCP) and Radio Link Control (RLC) acknowledgements (ACKS) and negative-acknowledgements (NACKS) during the power limited condition.

19. The apparatus of claim 15, further comprising means for deferring one or more unselected information for transmission after the power limited condition is no longer detected.

20. The apparatus of claim 15, wherein said means for detecting comprises means for detecting the first radio-frequency condition at the apparatus, when the apparatus is running out of transmit power.

21. The apparatus of claim 15, wherein said uplink data comprises at least part of a multi radio access bearer (MRAB) call.

22. A non-transitory computer readable storage medium comprising instructions that, when executed by a processor of an apparatus, cause the apparatus to:
- receive information selection criteria associated with a power limited condition;
- detect the power limited condition; and select information for transmission on a data channel, independent of the received information selection criteria; and one or a combination of:
  omit acknowledgements (ACKS) and negative-acknowledgements (NACKS) during the power limited condition;
  select Radio Link Control (RLC) acknowledgements (ACKS) and negative-acknowledgements (NACKS) during the power limited condition; or
  select Transmission Control Protocol (TCP) and Radio Link Control (RLC) acknowledgements (ACKS) and negative-acknowledgements (NACKS) during the power limited condition.

23. The medium of claim 22, further comprising instructions that, when executed by a processor of the apparatus, cause the apparatus to omit acknowledgements (ACKS) and negative-acknowledgements (NACKS) during the power limited condition.

24. The medium of claim 22, further comprising instructions that, when executed by a processor of the apparatus, cause the apparatus to select only Radio Link Control (RLC) acknowledgements (ACKS) and negative-acknowledgements (NACKS) during the power limited condition.

25. The medium of claim 22, further comprising instructions that, when executed by a processor of the apparatus, cause the apparatus to select only Transmission Control Protocol (TCP) and Radio Link Control (RLC) acknowledgements (ACKS) and negative-acknowledgements (NACKS) during the power limited condition.

26. The medium of claim 22, further comprising instructions that, when executed by a processor of the apparatus, cause the apparatus to defer one or more unselected information for transmission after the power limited condition is no longer detected.

27. The medium of claim 22, further comprising instructions that, when executed by a processor of the apparatus, cause the apparatus to detect the first radio-frequency condition at a wireless device, when the wireless device is running out of transmit power.

28. The medium of claim 22, wherein said uplink data comprises at least part of a multi radio access bearer (MRAB) call.

29. A method of improving wireless connection in a voice and data communication, comprising:
  receiving, at a mobile station, an instruction from a base station to allow specific communications during a power limited condition;
  detecting the power limited condition; and selecting information for transmission on an uplink channel that omits one or more blocks of information, even when such omission conflicts said instruction received from the base station, wherein information not selected for transmission is information requiring acknowledgement.

30. The method of claim 29, wherein information selected for transmission is information carrying voice information.

31. The method of claim 29, wherein information not selected for transmission is transmitted after the power limited condition no longer exists.

32. The method of claim 29, wherein information not selected for transmission comprises user data other than Radio Link Control (RLC) acknowledgements (ACKS) and negative-acknowledgements (NACKS).

33. An apparatus for improving wireless connection in a voice and data communication, comprising:
  means for receiving, at a mobile station, an instruction from a base station to allow specific communications during a power limited condition;
  means for detecting the power limited condition; and
  means for selecting information for transmission on an uplink channel that goes omits one or more blocks of information, even when such omission conflicts said instruction received from the base station, wherein information not selected for transmission is information requiring acknowledgement.

34. The apparatus of claim 33, wherein information selected for transmission is information carrying voice information.

35. The apparatus of claim 33, wherein information not selected for transmission is transmitted after the power limited condition no longer exists.

36. The apparatus of claim 33, wherein information not selected for transmission comprises user data other than Radio Link Control (RLC) acknowledgements (ACKS) and negative-acknowledgements (NACKS).

37. An apparatus for improving wireless connection in a voice and data communication, comprising:
  a receiver configured to receive, at a mobile station, an instruction from a base station to allow specific communications during a power limited condition; and
  a processor configured to:
  detect the power limited condition; and
  select information for transmission on an uplink channel that omits one or more blocks of information, even when such omission conflicts said instruction received from the base station, wherein information not selected for transmission is information requiring acknowledgement.

38. The apparatus of claim 37, wherein information selected for transmission is information carrying voice information.

39. The apparatus of claim 37, wherein information not selected for transmission is transmitted after the power limited condition no longer exists.

40. The apparatus of claim 37, wherein information not selected for transmission comprises user data other than Radio Link Control (RLC) acknowledgements (ACKS) and negative-acknowledgements (NACKS).

41. A non-transitory computer readable storage medium comprising instructions that, when executed by a processor of an apparatus, cause the apparatus to:
  receive, at a mobile station, an instruction from a base station to allow specific communications during a power limited condition; detect the power limited condition; and
  select information for transmission on an uplink channel that omits one or more blocks of information, even when such omission conflicts said instruction received from the base station, wherein information not selected for transmission is information requiring acknowledgement.

42. The medium of claim 41, wherein information selected for transmission is information carrying voice information.

43. The medium of claim 41, wherein information not selected for transmission is transmitted after the power limited condition no longer exists.

44. The medium of claim 41, wherein information not selected for transmission comprises user data other than Radio Link Control (RLC) acknowledgements (ACKS) and negative-acknowledgements (NACKS).

* * * * *